US009841305B2

(12) United States Patent
Konzelmann et al.

(10) Patent No.: US 9,841,305 B2
(45) Date of Patent: Dec. 12, 2017

(54) SENSOR DEVICE FOR DETERMINING AT LEAST ONE PARAMETER OF A FLUID MEDIUM FLOWING THROUGH A DUCT

(71) Applicant: Robert Bosch GmbH, Stuttgart (DE)

(72) Inventors: Uwe Konzelmann, Asperg (DE); Ulrich Wagner, Munich (DE); Edda Sommer, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 244 days.

(21) Appl. No.: 14/454,101

(22) Filed: Aug. 7, 2014

(65) Prior Publication Data

US 2015/0040653 A1 Feb. 12, 2015

(30) Foreign Application Priority Data

Aug. 7, 2013 (DE) .................. 10 2013 215 522

(51) Int. Cl.
| | |
|---|---|
| *G01F 1/69* | (2006.01) |
| *G01M 15/04* | (2006.01) |
| *G01F 1/684* | (2006.01) |
| *G01F 1/692* | (2006.01) |
| *G01F 5/00* | (2006.01) |

(52) U.S. Cl.
CPC .............. *G01F 1/69* (2013.01); *G01F 1/6845* (2013.01); *G01F 1/692* (2013.01); *G01F 5/00* (2013.01); *G01M 15/042* (2013.01)

(58) Field of Classification Search
CPC .......... G01F 1/6845; G01F 1/692; G01F 5/00; G01F 1/69
USPC ....................................... 73/53.01
See application file for complete search history.

(56) References Cited

U.S. PATENT DOCUMENTS 4,875,932 A * 10/1989 Uchiyama ................ G01F 5/00
73/198
5,313,832 A * 5/1994 Stephan ............... G01F 1/6845
73/204.26
5,415,029 A * 5/1995 Uchiyama ............... G01F 1/684
73/114.34

(Continued)

FOREIGN PATENT DOCUMENTS

| DE | 10 2010 020 264 | 12/2011 |
|---|---|---|
| WO | WO 02/073140 | 9/2002 |
| WO | WO 02/084226 | 10/2002 |

OTHER PUBLICATIONS

*Sensoren im Kraftfahrzeug* [Sensors in the Motor Vehicle], 1st ed. 2010, pp. 146-148.

*Primary Examiner* — Natalie Huls
*Assistant Examiner* — Monica S Young
(74) *Attorney, Agent, or Firm* — Norton Rose Fulbright US LLP; Gerard Messina

(57) ABSTRACT

A sensor device for determining at least one parameter of a fluid medium flowing through a duct, e.g., an intake air mass flow of an internal combustion engine, includes: a sensor housing, e.g., a sensor plug that is placed or that can be placed into a flow tube, in which the duct is fashioned; and at least one sensor chip situated in the duct for determining the parameter of the fluid medium. The sensor chip has a sensor area. The sensor housing has an inlet into the duct that is oriented opposite a main direction of flow of the fluid medium, and has at least one outlet from the duct. The sensor area is covered at least partly by an electrically conductive layer.

17 Claims, 4 Drawing Sheets

(56) References Cited

U.S. PATENT DOCUMENTS

| | | | | |
|---|---|---|---|---|
| 5,587,130 | A * | 12/1996 | Bao | C23C 8/10 338/34 |
| 5,705,745 | A * | 1/1998 | Treutler | G01F 1/6845 73/204.26 |
| 5,780,173 | A * | 7/1998 | Harrington | B82Y 15/00 205/170 |
| 6,017,775 | A * | 1/2000 | Igel | G01N 27/414 438/142 |
| 2002/0153368 | A1 * | 10/2002 | Gardner | B29C 70/82 219/545 |
| 2003/0159505 | A1 * | 8/2003 | Konzelmann | G01F 1/6845 73/204.26 |
| 2004/0069626 | A1 * | 4/2004 | Artmann | G01F 1/6845 204/400 |
| 2006/0138613 | A1 * | 6/2006 | Yung | H01L 23/50 257/666 |
| 2009/0205417 | A1 * | 8/2009 | Opitz | G01F 1/6986 73/204.26 |
| 2009/0211355 | A1 * | 8/2009 | Renninger | F02D 41/187 73/204.26 |
| 2009/0230499 | A1 * | 9/2009 | Warsop | G01F 1/6845 257/467 |
| 2010/0012642 | A1 * | 1/2010 | Zorn | F24D 13/02 219/213 |
| 2010/0064799 | A1 * | 3/2010 | Mais | G01F 1/6842 73/204.11 |
| 2010/0073886 | A1 * | 3/2010 | Hanazono | G01N 27/12 361/748 |
| 2010/0180675 | A1 * | 7/2010 | Schneider | G01F 1/6845 73/114.31 |
| 2011/0005813 | A1 * | 1/2011 | Boyd | A61N 1/025 174/257 |
| 2012/0048005 | A1 * | 3/2012 | Renninger | G01F 15/12 73/114.32 |
| 2013/0061684 | A1 * | 3/2013 | Frauenholz | G01F 1/6842 73/861 |
| 2013/0139584 | A1 * | 6/2013 | Qasimi | G01F 1/6842 73/204.21 |
| 2013/0283895 | A1 * | 10/2013 | Etherington | G01F 1/6842 73/114.34 |
| 2014/0311237 | A1 * | 10/2014 | Wagner | G01F 25/00 73/204.18 |
| 2015/0247744 | A1 * | 9/2015 | Tu | G01D 5/35316 250/227.14 |
| 2016/0013439 | A1 * | 1/2016 | Kinoshita | H05B 33/28 174/126.1 |

* cited by examiner

SENSOR DEVICE FOR DETERMINING AT LEAST ONE PARAMETER OF A FLUID MEDIUM FLOWING THROUGH A DUCT

BACKGROUND OF THE INVENTION

1. Field of the Invention

The present invention relates to a sensor device for determining at least one parameter of a fluid medium flowing through a duct.

2. Description of the Related Art

From the existing art, numerous methods and devices are known for determining at least one flow property of fluid media, i.e. of liquids and/or gases. Among the flow properties, possible parameters can include any measurable physical and/or chemical properties that quantify or qualify a flow of the fluid medium. In particular, this can be a flow speed and/or a mass flow and/or a volume flow.

In the following, the present invention is described in particular with reference to so-called hot-film air mass sensors, as known for example from Konrad Reif (pub.): Sensoren im Kraftfahrzeug [Sensors in the Motor Vehicle], $1^{st}$ ed. 2010, pp. 146-148. Such hot-film air mass sensors are as a rule based on a sensor chip, in particular a silicon sensor chip, for example having a sensor membrane as a measurement surface or sensor area over which the flowing fluid medium can flow. As a rule, the sensor chip includes at least one heating element as well as at least two temperature sensors that are for example situated on the measurement surface of the sensor chip, the one temperature sensor being positioned upstream from the heating element and the other temperature sensor being positioned downstream from the heating element. From an asymmetry of the temperature profile acquired by the temperature sensors, influenced by the flow of the fluid medium, a mass flow and/or volume flow of the fluid medium can be inferred.

Hot-film air mass sensors are standardly realized as sensor plugs that can be placed in a flow tube fixedly or exchangeably. For example, this flow tube can be an intake manifold of an internal combustion engine. Here, a partial flow of the medium flows through at least one main duct provided in the hot-film air mass sensor. Between the inlet and the outlet of the main duct, there is fashioned a bypass duct. In particular, the bypass duct is fashioned such that it has a curved segment for deflecting the partial flow of the medium entering through the inlet of the main duct, the curved segment transitioning, in its further course, into a segment in which the sensor chip is situated. The last-named segment is the actual measurement duct in which the sensor chip is situated.

Published international patent application document WO 02/084226 A1 discloses a sensor chip having potential surfaces for avoiding contamination on the sensor chip.

Published German patent application document DE 10 2010 020 264 A1 discloses a hot-film air mass sensor having a housing made of plastic that has an electrically insulating effect. In the housing, a flow duct is fashioned and there is situated a sensor element that acquires the air mass flowing in the flow duct. A part of the flow duct has electrostatically dissipative properties.

Published international patent application document WO 02/073140 A2 discloses a sensor chip having an additional heating unit for preventing contamination on the sensor chip.

Despite the numerous advantages of the methods known from the existing art for avoiding adhesion of particles carrying an electrical charge that impinge on the sensor area, there is still potential for improvement in these methods. For example, impinging particles carrying an electrical charge have up to now inadequately been kept away from the sensor area.

SUMMARY OF THE INVENTION

Therefore, a sensor device is proposed for determining at least one parameter of a fluid medium flowing through a duct that is capable of avoiding the advantages of known methods and strategies at least to a great extent, and in which in particular the adhesion of electrically charged particles can be minimized or prevented.

The sensor device according to the present invention for determining at least one parameter of a fluid medium flowing through a duct, in particular an intake air mass flow of an internal combustion engine, has a sensor housing, in particular a sensor plug attached or attachable in a flow tube, in which the duct is fashioned, and at least one sensor chip situated in the duct for determining the parameter of the fluid medium. The sensor housing has an inlet into the duct that is oriented opposite a main direction of flow of the fluid medium, and at least one outlet from the duct. The sensor chip has a sensor area and the sensor area is at least partly covered by an electrically conductive layer.

The electrically conductive layer can have, at least partly, a structuring. The electrically conductive layer can have a thickness of from 0.05 nm to 10 µm, and preferably from 0.2 nm to 1.0 nm.

The electrically conductive layer can be produced at least partly from a metal and/or noble metal. The electrically conductive layer can be produced at least partly from a material including at least one element from the group: platinum, aluminum, ruthenium, rhodium, palladium, silver, and gold. The electrically conductive layer can be electrically connected to at least one bonding pad in such a way that the electrically conductive layer is grounded. The sensor chip can have a ground bonding pad, the electrically conductive layer being electrically connected to the ground bonding pad. The electrically conductive layer can be situated such that the fluid medium can flow over the electrically conductive layer. The electrically conductive layer can be fashioned integrally with the sensor area. The sensor area can have at least one heating element and at least one temperature sensor.

In the context of the present invention, the main direction of flow is to be understood as the local direction of flow of the fluid medium at the location of the sensor or sensor device; local irregularities such as turbulences can be left out of account. In particular, the main direction of flow can therefore be understood as the local averaged transport direction of the flowing fluid medium at the location of the sensor system. In this context, the averaged transport direction relates to a transport direction in which the fluid medium predominantly flows, averaged over time.

In the context of the present invention, a downstream situation is to be understood as the situation of a component at a location at which the fluid medium, flowing in the main direction of flow, arrives later in time than it does at a reference point. Thus, for example a downstream situation of a temperature sensor relative to a heating element means that the fluid medium reaches the temperature sensor later in time than it reaches the heating element.

Analogously, in the context of the present invention an upstream situation of a component is to be understood as a situation of the component at a location at which the fluid medium, flowing in the main direction of flow, arrives earlier in time than it does at a reference point. Thus, for example an upstream situation of a temperature sensor relative to a heating element means that the fluid medium reaches the temperature sensor earlier in time than it reaches the heating element.

In the context of the present invention, a sensor chip is to be understood as a component that has at least one heating element and at least two temperature sensors situated on the sensor area of the sensor chip, the one temperature sensor being situated upstream from the heating element and the other temperature sensor being situated downstream from the heating element.

In the context of the present invention, a sensor area is to be understood as that area of a sensor chip, in particular of a silicon sensor chip, that fulfills the actual sensing function and over which the flowing fluid medium can flow. Consequently, components relevant for the sensing function, such as temperature sensors and heating element, are situated in the sensor area. The sensor area can be a measurement surface fashioned as a sensor membrane.

In the context of the present invention, a layer is to be understood as a uniform mass having a planar extension that can extend over, under, or between other components, and that has a certain height. A thickness of the layer is to be understood as a dimension of the layer perpendicular to the largest surface of the layer.

In the context of the present invention, a metal is to be understood as an element selected from the group of those elements that, in the periodic system of the elements, are situated in the area to the left of and underneath a line going from boron to astatine.

In the context of the present invention, a noble metal is to be understood as an element selected from the group of platinum metals, as well as gold and silver. The platinum metals include the elements of groups VIII through X of the fifth period and the sixth period, i.e. ruthenium, rhodium, palladium, osmium, iridium, and platinum.

In the context of the present invention, a bonding pad is to be understood as a surface that can be contacted electrically by a so-called bonding wire. In the context of the present invention, a bonding wire is to be understood as a wire that is suitable for connecting terminals of an integrated circuit or of a discrete semiconductor or of some other electronic component to the electrical terminals of a chip housing. In the context of the present invention, a chip housing is to be understood as the cladding of a semiconductor chip, i.e. a so-called die, including the connecting points, i.e. the so-called leads, pins, or balls.

In the context of the present invention, the term "ground" is to be understood as an electrically conductive body that as a rule is defined as having potential 0 V, and that represents the reference potential for all signal and operating voltages. Here, ground can be the common connection of the components.

According to the present invention, it is proposed that an electrically conductive layer be applied onto the sensor area as an integral component thereof. The layer can be structured if warranted, so that short circuits on the bonding pads are prevented, and at the same time the thermal measurement principles are not prevented. The layer can be produced from metal, or, if warranted, platinum or aluminum or gold. The conductive layer can be contacted via a separately produced bonding pad, and in this way can be grounded, or else can be connected directly to a ground bonding pad of the sensor chip. Because an interlacing, spanning the surface, of the atoms, such as the metal atoms, of the electrically conductive layer on the surface is already sufficient to carry off the otherwise stationary charge, a coating in the sub-nanometer range can have effects sufficient for preventing the adhesion of electrically charged particles. Through a structuring of the layer, disadvantageous side effects on the signal production, such as a falsification of the measurement signal due to changed heat conduction from the membrane to the main layer through the surface metallization, can be reduced.

DETAILED DESCRIPTION OF THE INVENTION

Figure 1:
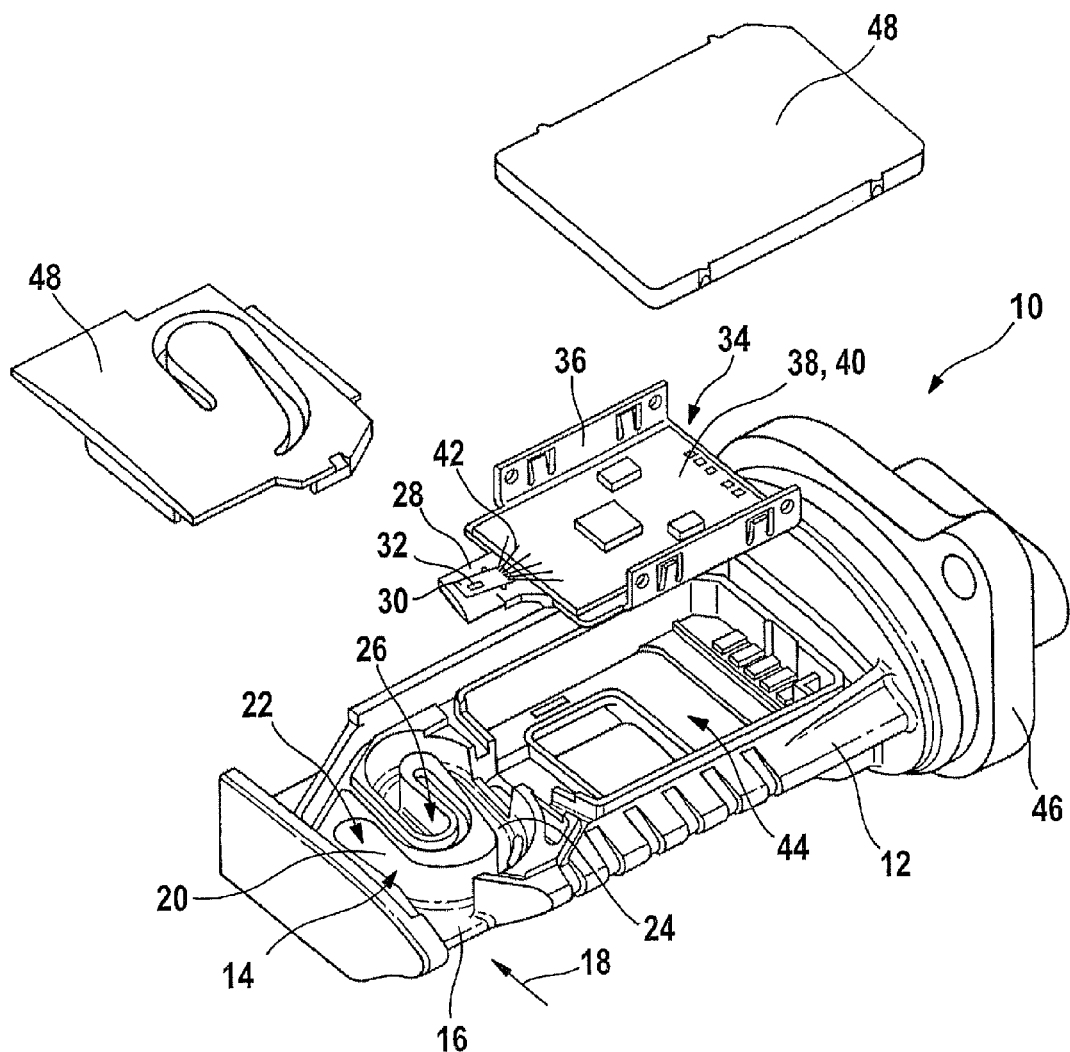
FIG. 1 shows a perspective representation of a sensor device according to the present invention.

FIG. 1 shows a perspective view of a sensor device 10 for determining a parameter of a fluid medium flowing through a duct. In this exemplary embodiment, sensor device 10 is realized as a hot-film air mass sensor, and can in particular acquire an intake air mass flow of an internal combustion engine. In this exemplary embodiment, the sensor device includes a sensor housing 12 that can be fashioned as a sensor plug that can be placed for example into a flow tube, in particular an intake manifold of the internal combustion engine. In sensor housing 12, there is accommodated a duct structure 14 through which a representative quantity of the fluid medium can flow via an inlet 16 that, in the installed state, is oriented opposite to a main direction of flow 18 of the fluid medium.

FIG. 1 shows a segment of sensor housing 12 in the area of duct structure 14. Duct structure 14 has a main duct 20 that opens into a main duct outlet 22 on a lower side of sensor housing 12, relative to the representation shown in FIG. 1, as well as a bypass or measurement duct 24 that branches off from main duct 20, and that also opens into an outlet 26 of bypass or measurement duct 24 on the lower side (relative to the representation in FIG. 1) of sensor housing 12.

As in conventional hot-film air mass sensors, a sensor bearer 28 in the shape of a wing extends into measurement duct 24. In this sensor bearer 28, a sensor chip 30 is embedded in such a way that the fluid medium can flow over a sensor membrane fashioned as sensor area 32 of sensor chip 30. Sensor bearer 28, together with sensor chip 30, is a component of an electronics module 34 that has a bent base plate 36 as well as a circuit board 38, attached on the base plate for example by adhesive, having a control and evaluation circuit 40. Sensor bearer 28 can for example be injected onto base plate 36 as a plastic component. Sensor bearer 28, which for example is injected onto the base plate as an injection-molded component or can be fashioned integrally with base plate 36 of circuit board 38, is provided with a leading edge that can be made rounded.

Sensor chip 30 is electrically connected to control and evaluation circuit 40 via electrical connections 42, here realized as bonding wires. Electronics module 34 that arises in this way is placed, for example glued, into an electronics chamber 44 in a housing 46 of sensor housing 12 in which duct structure 14 is also fashioned, as can be seen in FIG. 1.

This takes place in such a way that sensor bearer 28 extends into duct structure 14. Subsequently, electronics chamber 44 and duct structure 14 are closed by cover 48.

Figure 2:
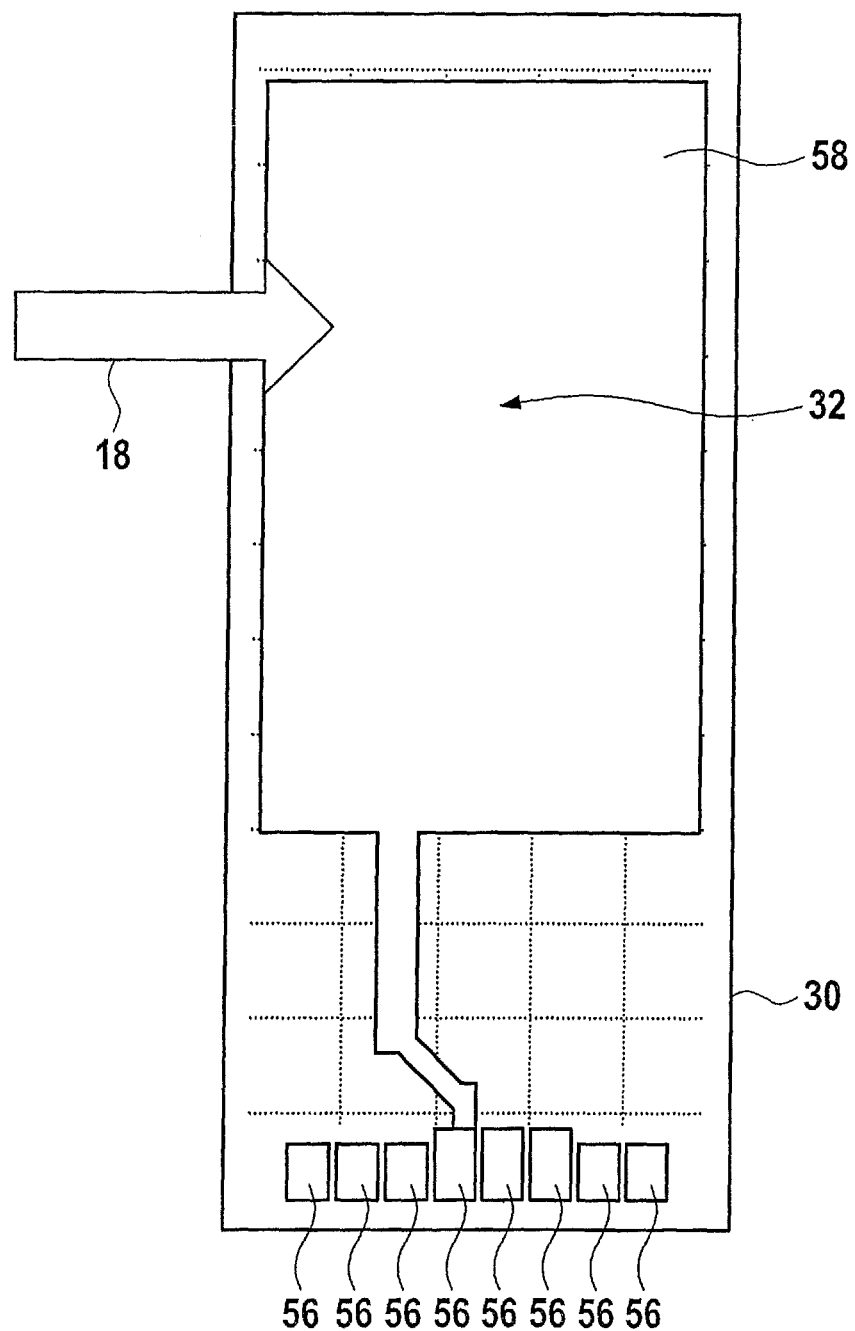
FIG. 2 shows a schematic top view of a sensor area of a sensor chip according to a first specific embodiment.
Figure 3:
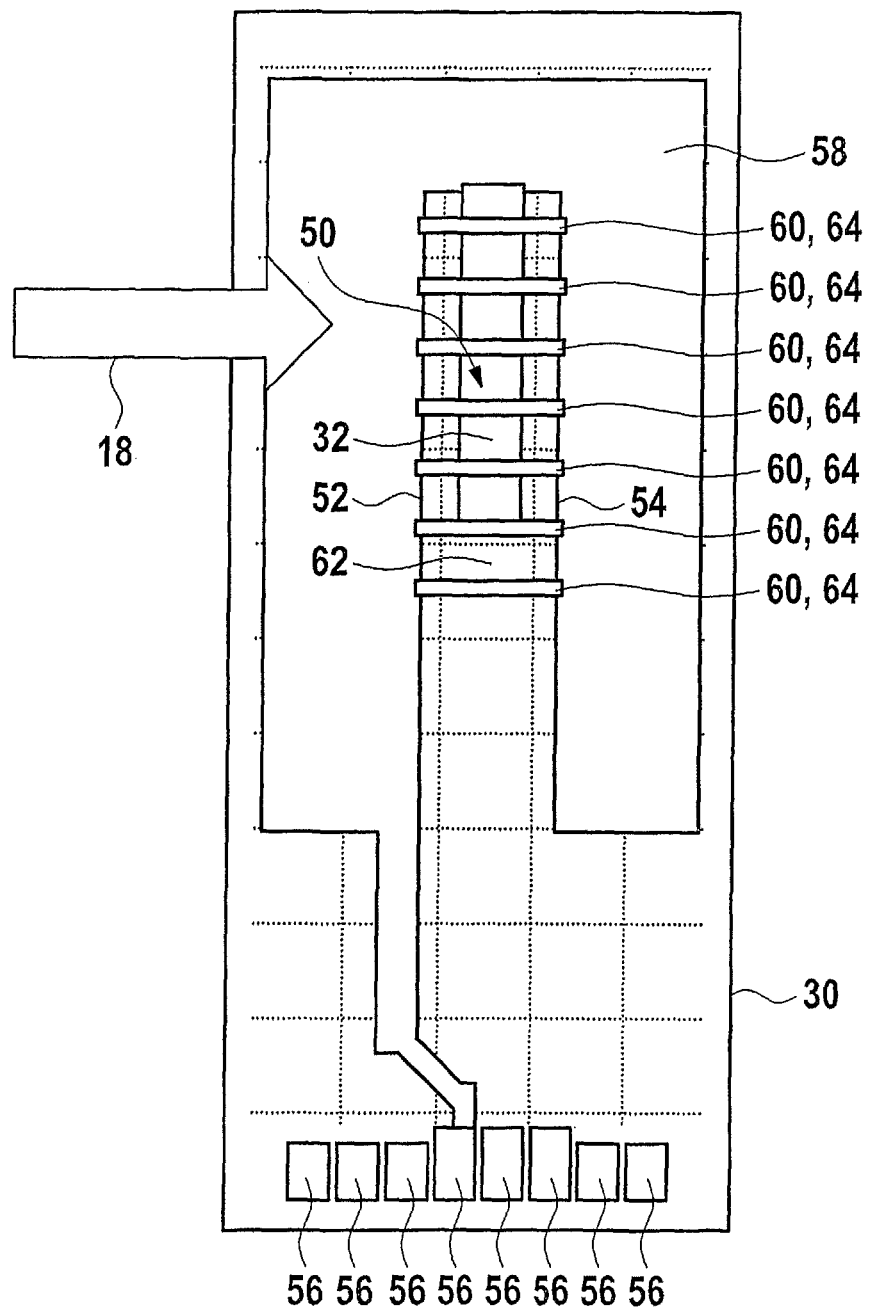
FIG. 3 shows a schematic top view of a sensor area of a sensor chip according to a second specific embodiment.

FIG. 2 shows a schematic top view of a sensor area 32 of sensor chip 30 according to a first specific embodiment. Sensor area 32 includes a heating element 50 and two temperature sensors 52, 54 (FIG. 3). Relative to main direction of flow 18, a first temperature sensor is situated upstream from heating element 50 and a second temperature sensor 54 is situated downstream from heating element 50. Both heating element 50 and temperature sensors 52, 54 can be realized as electrical resistances connected electrically to bonding pads 56. Bonding pads 56 are, as mentioned above, connected to control and evaluation circuit 40 via electrical connections 42, fashioned as bonding wires.

Sensor area 32 is covered at least partly by an electrically conductive layer 58. In the exemplary embodiment shown in FIG. 2, sensor area 32 is covered completely by electrically conductive layer 58. In the representation of FIG. 2, heating element 50 and the two temperature sensors 52, 54 are not shown, because they are covered by layer 58. The position and shape of heating element 50 and of the two temperature sensors 52, 54 can however be seen for example in FIG. 3, described below. Electrically conductive layer 58 can be produced at least partly from a metal and/or noble metal. For example, the material of electrically conductive layer 58 is selected from the group made up of platinum, aluminum, ruthenium, rhodium, palladium, silver, and gold. For example, layer 58 is made of gold. Layer 58 can have a thickness of from 0.05 nm to 10 μm, and preferably from 0.2 nm to 1.0 nm, for example 0.5 nm or 0.8 nm. Electrically conductive layer 58 can be situated such that the fluid medium can flow over it. For example, electrically conductive layer 58 is fashioned integrally with sensor area 32. Layer 58 can also be electrically connected by one of the bonding pads 56, and in this way grounded. Alternatively, sensor chip 30 can have a ground bonding pad, layer 58 being electrically connected directly to a ground bonding pad of sensor chip 30.

The flowing fluid medium can contain impurities that can cause contamination of sensor chip 30. These are for example dust particles, oil, or salts dissolved in water. In order to prevent or reduce contamination, layer 58 is provided, as described in more detail below. Because layer 58 is preferably at ground, it has a potential of 0 V. In this case, layer 58 is connected to control and evaluation circuit 40 by a thin-wire bond.

Through the electrical interaction of layer 58 with the liquid or dirt particles contained in the flowing fluid medium, deposition in sensor area 32 is prevented because electrical charges are neutralized by charge transitions on layer 58, so that the mechanism caused by accumulation of these particles is deactivated. The electrically neutralized particles therefore cannot accumulate in sensor area 32, and are then further transported by the flowing fluid medium. Device 10 can also be used, by applying a voltage, in particular an alternating voltage, to layer 58, to provide, actively and alternating in portions if warranted, charges of a polarity by which a rapid neutralization can be brought about of charged foreign particles that may be present.

FIG. 3 shows a schematic top view of a sensor area 32 of sensor chip 30 according to a second specific embodiment. In the following, only the differences from the first specific embodiment are described, and identical components are provided with identical reference characters. As can be seen in FIG. 3, electrically conductive layer 58 can be made U-shaped in such a way that at least heating element 50 is not covered by layer 58. In addition, temperature sensors 52, 54 can be left open, and thus not covered by layer 58. Correspondingly, a rectangular segment 62 that is left exposed is formed above heating element 50. As a further possible modification, electrically conductive layer 58 can have, at least partly, a structuring 60. For example, structuring 60 is made such that it is fashioned from a plurality of rectangular thin segments 64 running parallel to one another that cover heating element 50 in the manner of a ladder and extend between the limbs of U-shaped layer 58 in such a way that segments 64 connect the limbs of U-shaped layer 58.

Figure 4:
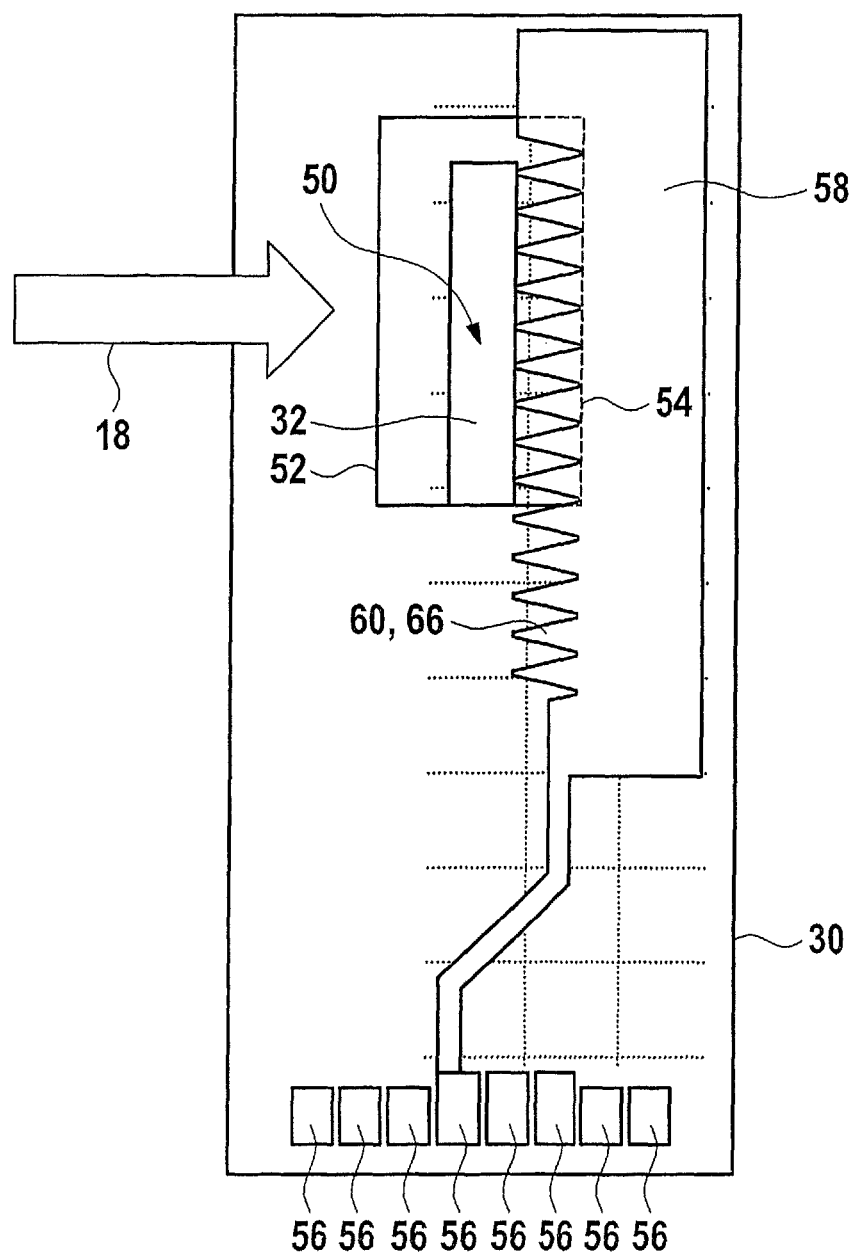
FIG. 4 shows a schematic top view of a sensor area of a sensor chip according to a third specific embodiment.

FIG. 4 shows a schematic top view of a sensor area 32 of sensor chip 30 according to a third specific embodiment. In the following, only the differences from the previous specific embodiments are described, and identical components are provided with identical reference characters. In this specific embodiment, layer 58 covers only one half of sensor chip 30, relative to the division in half perpendicular to main direction of flow 18. For example, layer 58 is fashioned such that only that half of sensor chip 30 is covered on which second temperature sensor 54 is situated, downstream from heating element 50. Thus, second temperature sensor 54 is at least partly covered by layer 58, but heating element 50 and first temperature sensor 52 are not. In the exemplary embodiment shown in FIG. 4, electrically conductive layer 58 can also additionally have, at least partly, a structuring 60. For example, structuring 60 is fashioned as a zigzag-shaped edge 66 of layer 58, covering second temperature sensor 54 at least partly.

What is claimed is:

1. A sensor device for determining a parameter of a fluid medium flowing through a duct of an internal combustion engine, comprising: a sensor housing configured as a sensor plug placed into a flow tube in which the duct is provided; and at least one sensor chip situated in the duct for determining the parameter of the fluid medium; wherein the sensor chip has a sensor area, and wherein the sensor housing has (i) an inlet into the duct, the inlet being directed opposite a main direction of flow of the fluid medium, and (ii) at least one outlet from the duct, wherein the sensor area is covered at least partly by an electrically conductive layer, wherein the sensor chip has at least one ground bonding pad, and wherein the electrically conductive layer is electrically connected to the at least one ground bonding pad and is grounded by the grounding pad, and wherein the electrically conductive layer is situated such that the electrically conductive layer electrically neutralizes particles contained in the fluid medium via the grounding; wherein the electrically conductive layer is integrally configured with the sensor area.

2. The sensor device as recited in claim 1, wherein the electrically conductive layer has a thickness in the range of 0.2 nm to 1.0 nm.

3. The sensor device as recited in claim 1, wherein the electrically conductive layer includes at least a noble metal.

4. The sensor device as recited in claim 1, wherein the electrically conductive layer includes at least one of platinum, aluminum, ruthenium, rhodium, palladium, silver, and gold.

5. The sensor device as recited n claim 1, wherein the sensor area has at least one heating element and at least one temperature sensor.

6. The sensor device as recited in claim 1, wherein the sensor area has at least one heating element, and wherein the electrically conductive layer is shaped in such a way that the at least one heating element is not covered by the electrically conductive layer.

7. The sensor device as recited in claim 1, wherein the sensor area has at least one heating element and at least one temperature sensor, and wherein the electrically conductive layer is continuous and covers both the at least one heating element and the at least one temperature sensor.

8. The sensor device as recited in claim 1, wherein the electrically conductive layer is situated such that the fluid medium flows over the electrically conductive layer so that the electrically conductive layer neutralizes the particles in the fluid medium.

9. The sensor device as recited in claim 1, wherein the electrically conductive layer has a potential of 0 volts.

10. A sensor device for determining a parameter of a fluid medium flowing through a duct of an internal combustion engine, comprising:
a sensor housing configured as a sensor plug placed into a flow tube in which the duct is provided, the sensor housing has (i) an inlet into the duct, the inlet being directed opposite a main direction of flow of the fluid medium, and (ii) at least one outlet from the duct; and
a sensor chip situated in the duct for determining the parameter of the fluid medium, the sensor chip including a U-shaped electrically conductive layer, the electrically conductive layer being grounded and being situated such that the electrically conductive layer electrically neutralizes particles contained in the fluid medium, the sensor chip further including a heating element surrounded on three sides by the U-shaped electrically conductive layer, and at least one sensor situated adjacent to the heating element.

11. The sensor device as recited in claim 10, wherein limbs of the U-shaped electrically conductive layer are connected by an electrically conductive portion that is at least partly structured.

12. The sensor device as recited in claim 11, wherein the at least partly structured electrically conductive portion includes a plurality of rectangular segments, each rectangular segment arranged parallel to adjacent segments, wherein the rectangular segments at least partially cover the heating element.

13. The sensor device as recited in claim 10, further comprising: a grounding pad, wherein the electrically conductive layer a electrically connected to at least one bonding pad in such a way that the electrically conductive layer a grounded.

14. The sensor device as recited in claim 10, wherein the sensor chip has a ground bonding pad, and wherein the electrically conductive layer is electricaliy connected to the ground bonding pad.

15. The sensor device as recited in claim 10, wherein the electrically conductive layer is situated such that the fluid medium flows over the electrically conductive layer.

16. The sensor device as recited in claim 10, wherein the electrically conductive layer has a potential of 0 volts.

17. The sensor device as recited in claim 10, wherein the sensor includes at least one temperature sensor.

* * * * *